United States Patent
Lee et al.

(10) Patent No.: US 9,448,999 B2
(45) Date of Patent: Sep. 20, 2016

(54) METHOD AND DEVICE TO DETECT SIMILAR DOCUMENTS

(75) Inventors: Chae Hyun Lee, Seongnam-si (KR); Dong Yun Sim, Seongnam-si (KR)

(73) Assignee: NHN Corporation, Seongnam-Si (KR)

( * ) Notice: Subject to any disclaimer, the term of this patent is extended or adjusted under 35 U.S.C. 154(b) by 123 days.

(21) Appl. No.: 13/462,592

(22) Filed: May 2, 2012

(65) Prior Publication Data

US 2012/0284270 A1    Nov. 8, 2012

(30) Foreign Application Priority Data

May 4, 2011    (KR) .................. 10-2011-0042303

(51) Int. Cl.
*G06F 17/30*    (2006.01)
(52) U.S. Cl.
CPC ... *G06F 17/30011* (2013.01); *G06F 17/30312* (2013.01); *G06F 17/30321* (2013.01); *G06F 17/3033* (2013.01)
(58) Field of Classification Search
CPC .............. G06F 17/30011; G06F 17/2211; G06F 17/30554; G06F 17/30867; G06F 17/3089; G06F 17/30864; G06F 17/3053; G06F 17/3071; G06F 17/30312; G06F 17/30321; G06F 17/3033
USPC .................................. 707/737, 706
See application file for complete search history.

(56) References Cited

U.S. PATENT DOCUMENTS

| | | | |
|---|---|---|---|
| 7,627,613 B1 * | 12/2009 | Dulitz | G06F 17/30864 |
| 7,660,819 B1 | 2/2010 | Frieder et al. | |
| 8,055,078 B2 * | 11/2011 | Choi | G06K 9/38 382/209 |
| 8,140,505 B1 * | 3/2012 | Jain et al. | 707/706 |
| 8,661,341 B1 * | 2/2014 | van Dijk | 715/257 |

(Continued)

FOREIGN PATENT DOCUMENTS

| | | |
|---|---|---|
| JP | 2004-318527 A | 11/2004 |
| JP | 2010-267108 A | 11/2010 |
| KR | 10-2010-0008885 | 1/2010 |

OTHER PUBLICATIONS

Kai Gao "The Strategy on Replicate and Similar Web Collections' Detecting and Clustering" School of Information Science & Engineering, Hebei University of Science and Technology, No. 70, pp. 221-231, Aug. 29, 2009, Hebei, China.

(Continued)

*Primary Examiner* — Tony Mahmoudi
*Assistant Examiner* — Merilyn Nguyen
(74) *Attorney, Agent, or Firm* — Harness, Dickey & Pierce, P.L.C.

(57) ABSTRACT

A method for detecting similar documents includes extracting an entity from each of a first web document and a second web document; determining an importance contribution element corresponding to each of the web documents; calculating, using the processor, weights for each entity based on the determined importance contribution elements; and determining whether the web documents are similar documents based on the calculated weights. A device to detect similar documents includes a storage device; an entity extractor stored on the storage device and configured to extract an entity from a first web document and a second web document and to determine an importance contribution element from each of the web documents; a weight calculator configured to calculate weights of each entity based on the determined importance contribution elements; and a similar document detection unit configured to determine whether the web documents are similar documents based on the calculated weights.

18 Claims, 7 Drawing Sheets

| ENTITY | HASH VALUE | DUPLICATED NUMBER OF TIMES | WEIGHT |
|---|---|---|---|
| http://abc.com/title.png | a9endienhgl | 10 | 0.00 |
| title/pattern | ekg589a9dn | 3 | 0.53 |
| title/recognition | 2n944ndhfln | 2 | 0.61 |
| isbn_code/978-89-5596-300-7 | n69d0hendk | 1 | 0.76 |

(56) References Cited

U.S. PATENT DOCUMENTS

| | | | |
|---|---|---|---|
| 9,183,173 B2* | 11/2015 | Yih | G06F 15/18 |
| 2008/0120292 A1* | 5/2008 | Sundaresan et al. | 707/5 |
| 2008/0263026 A1 | 10/2008 | Sasturkar et al. | |
| 2008/0313128 A1* | 12/2008 | Arasu | G06F 17/30312 |
| 2009/0150371 A1 | 6/2009 | Dasdan et al. | |
| 2009/0150381 A1* | 6/2009 | Dasdan et al. | 707/5 |
| 2009/0220166 A1* | 9/2009 | Choi | G06K 9/38 382/260 |
| 2010/0174686 A1 | 7/2010 | Acharya et al. | |
| 2011/0219012 A1* | 9/2011 | Yih et al. | 707/749 |
| 2011/0271232 A1* | 11/2011 | Crochet | G06F 17/2211 715/810 |

OTHER PUBLICATIONS

Japanese Office Action dated Jan. 26, 2016 in corresponding Japanese Application No. 2012-063358.

* cited by examiner

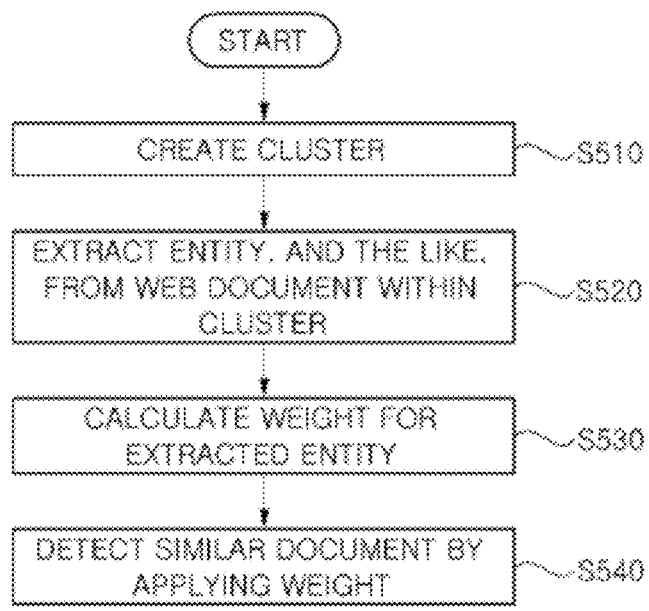

```
<html>
    <head>
                            <title>hello world!</title>
    </head>
    <body>
                            this is body
    </body>
</html>
```

FIG. 8A

```
<div id=title>
    <span id=titleimg><img src="http://abc.com/title.png"></span>
    pattern recognition
</div>
<div id=isbn_code>
    978-89-5596-300-7
</div>
```

FIG. 8B

| ENTITY | HASH VALUE |
|---|---|
| http://abc.com/title.png | a9endienhgl |
| title/pattern | ekg589s9dn |
| title/recognition | 2n944ndhfln |
| isbn_code/978-89-5596-300-7 | n69d0hendk |

FIG. 8C

| ENTITY | HASH VALUE | DUPLICATED NUMBER OF TIMES |
|---|---|---|
| http://abc.com/title.png | a9endienhgl | 10 |
| title/pattern | ekg589s9dn | 3 |
| title/recognition | 2n944ndhfln | 2 |
| isbn_code/978-89-5596-300-7 | n69d0hendk | 1 |

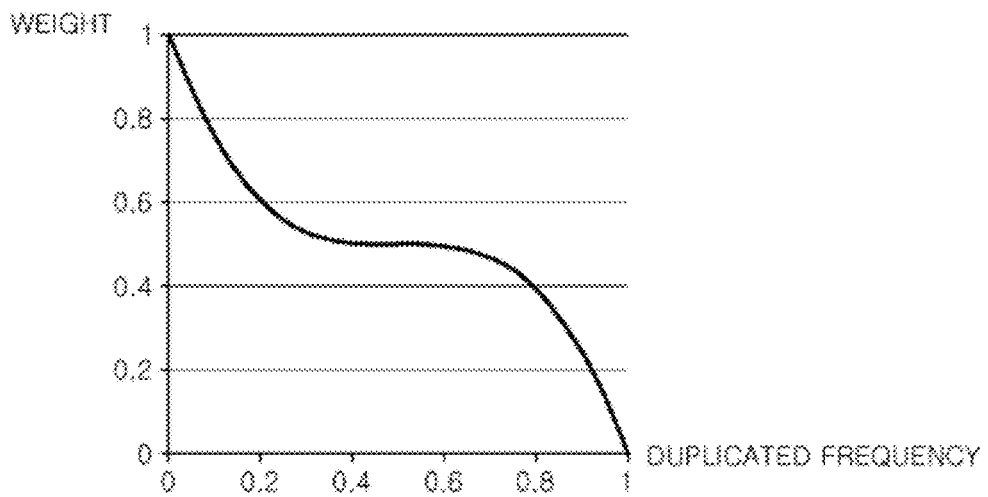

METHOD AND DEVICE TO DETECT SIMILAR DOCUMENTS

CROSS-REFERENCE TO RELATED APPLICATIONS

This application claims priority from and the benefit of Korean Patent Application No. 10-2011-0042303, filed on May 4, 2011, which is hereby incorporated by reference for all purposes as if fully set forth herein.

BACKGROUND

1. Field

The present disclosure relates to a method, a device, and a computer readable recording medium to provide improved detection of similar documents.

2. Discussion of the Background

As use of the Internet is becoming increasingly common, users can obtain various information through an Internet search. That is, the users may input one or more identifiers (e.g., a Uniform Resource Locator (URL), an Internet Protocol (IP) address, and the like), to an address window of a web browser through terminal devices, which may have access to the Internet so as to access Internet search sites. The user may input search words to search and see corresponding search results related to various fields, such as news, knowledge, game, community, web documents, and the like. The terminal devices may include, without limitation, a personal computer (PC), a smart television (TV), a tablet, and other portable electronics with Internet access.

As such, in order to appropriately display contents that may be sought by the users, an Internet search site provider may generally design and configure a search engine to collect various web documents, to configure indexes in the collected web documents and to provide the searched results to users based on the configured indexes. In particular, a web crawler or a search engine (collectively referred to as a web crawler) may play a role of searching and collecting the web documents existing on the Internet using a systematic and automatic method.

As one of the operations of the web crawler, an operation of recognizing one or more hyperlinks referred to and/or included in a URL list, which may be referred to as a seed, to update a URL list and recursively visiting web documents corresponding to the updated URL list may be used.

However, among the web documents to be generally collected, the contents thereof may be similar or practically the same. Therefore, even if users may not intend or desire to separately collect the web documents, the users may visit and collect various web documents included in the URL list, including those that may be similar or the same, at the time of searching and collecting the web documents according to an operation of the web crawler. Capturing of duplicate web documents may contribute to a problem of wasted storage space in which the collected web documents are stored. Further, additional problems of degradation in performance and efficiency of the search engine, and the like may also be incurred.

To solve these problems, a technology of detecting similar web documents (hereinafter referred as simply similar documents) performs operations, such as deleting duplicated documents from the storage space if the web documents are determined to be similar documents, reducing the collection speed of the paths through which the corresponding documents may be found.

However, the technology of detecting similar documents may determine whether documents are similar to one another based on sizes of the respective documents. In this case, even though most portions of the web documents may be the same, the web documents may not be considered to be similar documents if a difference in sizes of the web documents is above a reference threshold. However, the web documents may be determined to be similar if the difference in sizes of the web documents is determined to be within or below the reference threshold, even if the web documents may actually be different. Accordingly, the technology of detecting similar documents may hinder a normal document collection operation and degrade search quality.

FIG. 1A and FIG. 1B are diagrams illustrating an example of the case in which web documents are determined as similar documents by a technology of detecting similar documents. A problem of the technology of detecting similar documents will be described with reference to FIG. 1A and FIG. 1B.

FIG. 1A and FIG. 1B illustrate web documents, which may have different URLs, that can be collected by a web crawler. Here, description information displayed in region A of FIG. 1A and region A' of FIG. 1B may be determined to be core portions or portions of interest in the web documents. The description information may include, without limitation, brand names, product codes, and the like. Referring to FIG. 1A and FIG. 1B, although the core portions (regions A and A') may be determined to be different from one another, the non-core portions (regions B and C) may be considered similar. In an example, non-core portions may include information, such as menus, options, product detailed information and the like.

However, if the non-core portions (regions B and C) occupy a large amount of size with respect to the whole web document, the technology of detecting similar documents may determine the web documents are similar documents if the difference in the sizes of the web documents is within or below the reference threshold. More specifically, even if the core portions or regions A and A' are different, if the difference in sizes of the web documents is within or below the reference threshold, the web documents may be considered to be similar documents. Accordingly, the technology of detecting similar documents may determine different web documents as similar documents and not include them in the search results, thereby degrading the search quality.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a method, a device, and a computer readable recording medium to provide improved detection of similar documents.

Additional features of the invention will be set forth in the description which follows, and in part will be apparent from the description, or may be learned by practice of the invention.

Exemplary embodiments of the present invention provide a method that uses a processor for detecting similar documents including extracting an entity from each of a first web document and a second web document; determining an importance contribution element corresponding to each of the web documents; calculating, using the processor, weights for each entity based on the determined importance contribution elements; and determining whether the web documents are similar documents based on the calculated weights.

Exemplary embodiments of the present invention provide a non-transitory computer-readable medium comprising an executable program, wherein the program, if executed, performs a method including extracting an entity from each of a first web document and a second web document; determining an importance contribution element corresponding to each of the web documents; calculating weights for each entity based on the determined importance contribution elements; and determining whether the web documents are similar documents based on the calculated weights.

Exemplary embodiments of the present invention provide a device to detect similar documents including a storage device; an entity extractor stored on the storage device and configured to extract an entity from a first web document and a second web document and to determine an importance contribution element from each of the web documents; a weight calculator configured to calculate weights of each entity based on the determined importance contribution elements; and a similar document detection unit configured to determine whether the web documents are similar documents based on the calculated weights.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention:

FIG. 5 is a flow chart illustrating a method for detecting a similar document according to an exemplary embodiment of the invention.

FIG. 6 is a diagram illustrating a method for calculating a SimHash of a web document according to an exemplary embodiment of the invention.

FIG. 8A to FIG. 8C are diagrams illustrating extraction of an entity of a web document and a related value according to an exemplary embodiment of the invention.

FIG. 9A and FIG. 9B are diagrams illustrating weight calculations for one or more entities according to an exemplary embodiment of the invention.

FIG. 10 is a diagram illustrating a method for calculating a SimHash to which the weights are applied according to an exemplary embodiment of the invention.

DETAILED DESCRIPTION OF THE ILLUSTRATED EMBODIMENTS

Figure 1A:
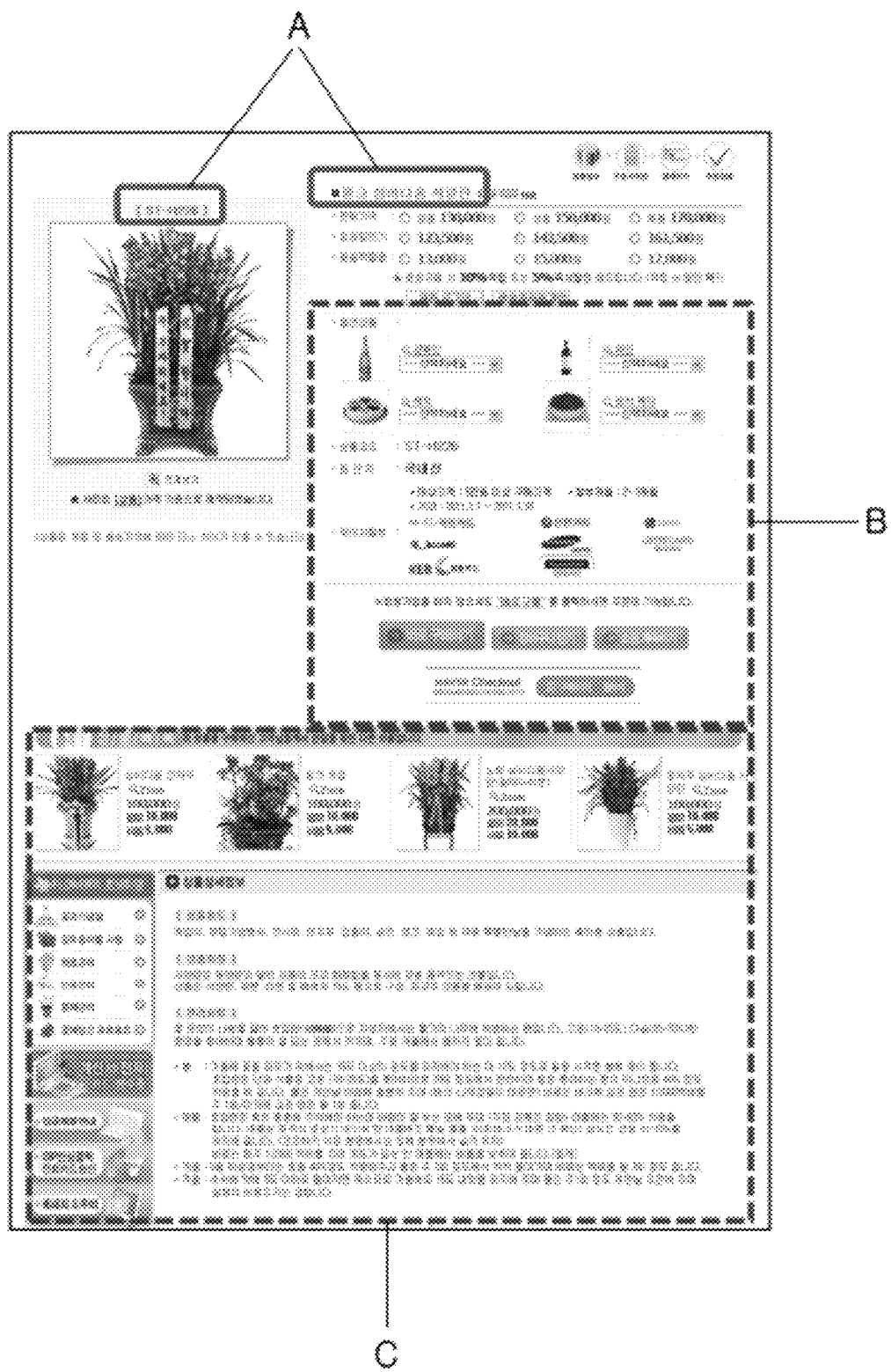
FIG. 1A and FIG. 1B are diagrams illustrating an example of the case in which web documents are recognized as similar documents by a technology of detecting similar documents.
Figure 1B:
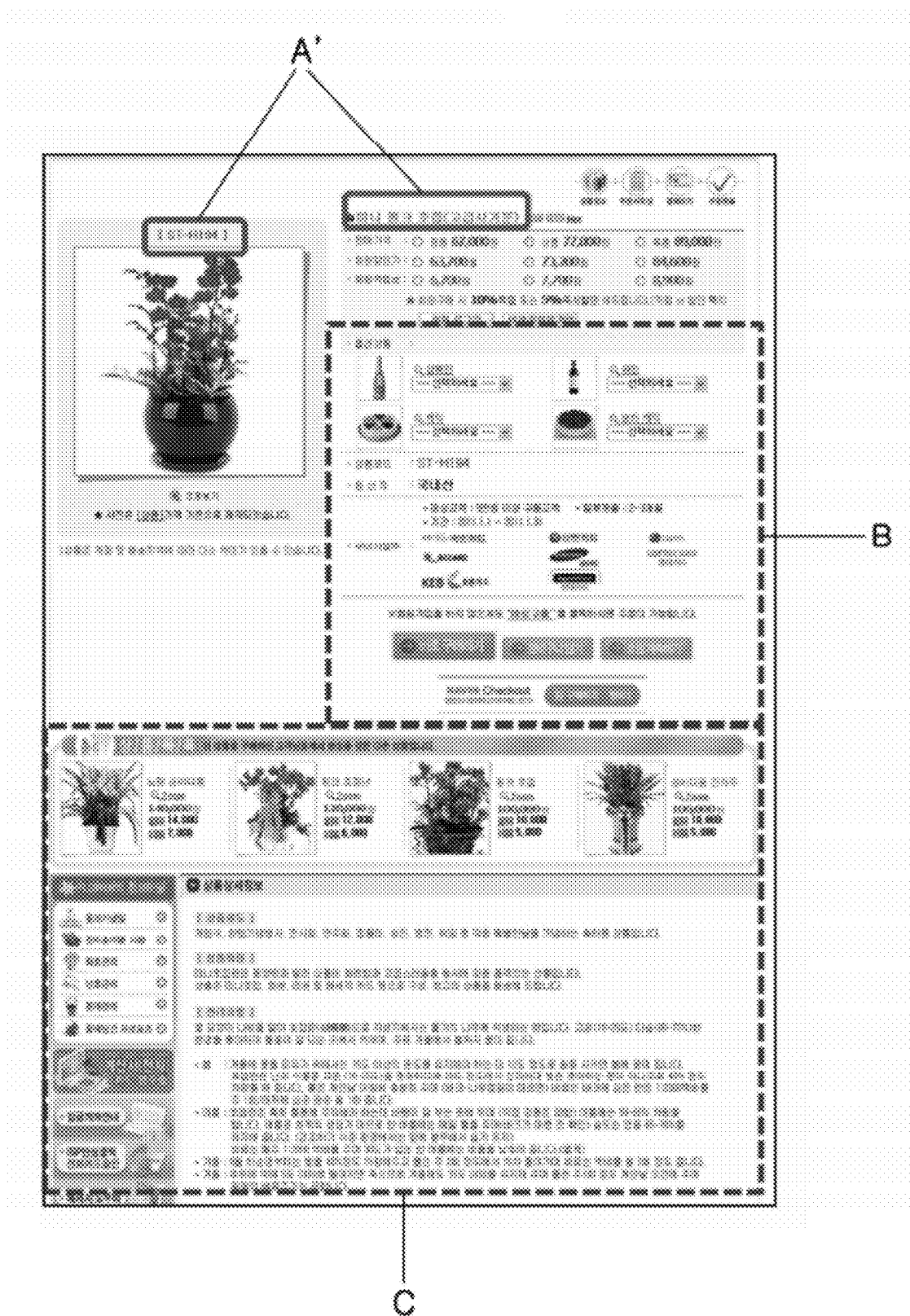

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. For example, specific shapes, configurations, and characteristics described in an exemplary embodiment of the invention may be implemented in another exemplary embodiment without departing from the spirit and the scope of the present invention. Throughout the drawings and the detailed description, unless otherwise described, the same drawing reference numerals are understood to refer to the same elements, features, and structures. The relative size and depiction of these elements may be exaggerated for clarity.

Further, it will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ).

Hereinafter, exemplary embodiments of the invention will be described in detail with reference to the accompanying drawings.

In exemplary embodiments of the invention, the term web document is to be construed broadly. In an example, the web document may include, without limitation, a passive or an active document format, which may be read using a web browser program such as Internet Explorer, and the like. Further, a document format of the web document may include HyperText Markup Language (HTML) but is not necessarily limited thereto. Therefore, one or more of the document formats capable of being read using the web browser program including eXtensible Markup Language (XML), Standard Generalized Markup Language (SGML) may correspond to web documents. In order to read the web documents using the web browser programs, an address in which the web documents are located may be inputted as a Uniform Resource Locator (URL). The URL may be in a HyperText Transfer Protocol (HTTP) format, but is not limited thereto.

Further, in the exemplary embodiments of the invention, the term URL, which may refer to a location of files existing in a server providing services on a web, may include, without limitation, at least one of a type of services to be accessed, a location of a server (domain name), and a location of a file. In an example, a general syntax of the URL may be configured in a format such as "<<protocol>>://<<host name>>/<<path>>/<<file name>>?<<parameter>>". Here, a path may refer to one or more paths and a parameter may refer to one or more parameters. For example, in the URL, such as http://www.naver.com/a/b/c.html?x=1&y=2, the protocol is http, the host name is www.naver.com, the path is /a/b/, the file name is c.html, and the parameter is x and y of which the values may each be 1 and 2.

Meanwhile, in exemplary embodiments of the invention, the term similar document may be interpreted broadly, which may indicate that a plurality of web documents in which contents are determined to be the same or similar within a reference range, or some portions of the web documents, including cores of the contents, are the same or similar within a reference range. If considering a search engine, similar duplicated web documents or contents may be deleted from a storage space so that they are not searched by the search engine.

Figure 2:
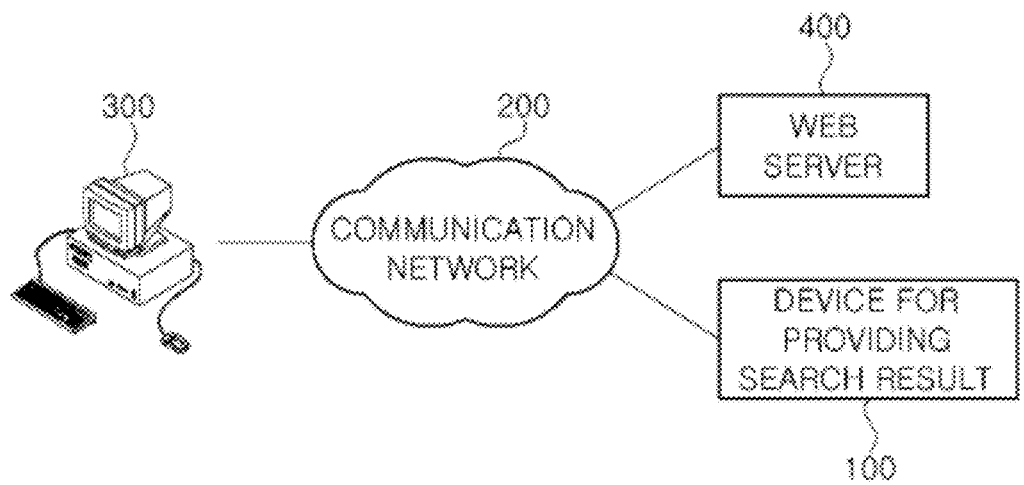
FIG. 2 is a schematic diagram illustrating a system configuration including a device to provide a search result according to an exemplary embodiment of the invention.

FIG. 2 is a schematic diagram illustrating a system configuration including a device 100 to provide a search result according to an exemplary embodiment of the invention.

As shown in FIG. 2, the device 100 to provide search results may have a search database and be connected with one or more user terminal devices 300 and one or more web document servers 400 over a communication network 200.

First, the device 100 may receive search words or queries from the user terminal device 300 and perform a search based on the queries. The device 100 may further transmit search results to the user terminal device 300. In addition, the device 100 may create one or more clusters in which similar documents may be present among various web documents. The web documents may be collected from a web document server 400 using a collection unit (see 120 of FIG. 3). Further, the device 100 may detect the similar documents from the created clusters, and delete the similar duplicated documents if the similar documents are stored in the search database.

Further, the communication network 200 may be configured regardless of communication types. The communication types may include, without limitation, a wired connection, a wireless connection, and the like. Further, the communication network 200 may be configured to include various communication networks, which may include a Personal Area Network (PAN), a Local Area Network (LAN), Metropolitan Area Network (MAN), a Wide Area Network (WAN), and the like.

The user terminals device 300 may be an input/output device including an operation of connecting with the device 100 to provide search results over the communication network 200. Accordingly, a user may receive search results in response to one or more reference queries. Further, one or more digital devices may include a memory component, which may be mounted with a microprocessor to have arithmetic ability. Such devices may include, without limitation, a desktop computer, a notebook computer, a workstation, a palmtop computer, a smart television (TV), a mobile communication terminal, a personal digital assistant (PDA), a web pad, a smart phone, and the like. The user terminal device 300 may be connected with the device 100 to provide search results in response to the inputted queries. In addition, the user terminal device 300 may execute a web browser to receive the search results, but may not be limited thereto.

The web document server 400 may be collectively referred to as a web server, which may include web documents to be collected by a collection unit within the device 100 to provide search results. Further, the web document server 400 may not be limited to the web documents of specific servers or specific contents/formats. One or more web servers accessed by the collection unit over the communication network 200 may be able to collect the web documents included in the web document server 400.

Figure 3:
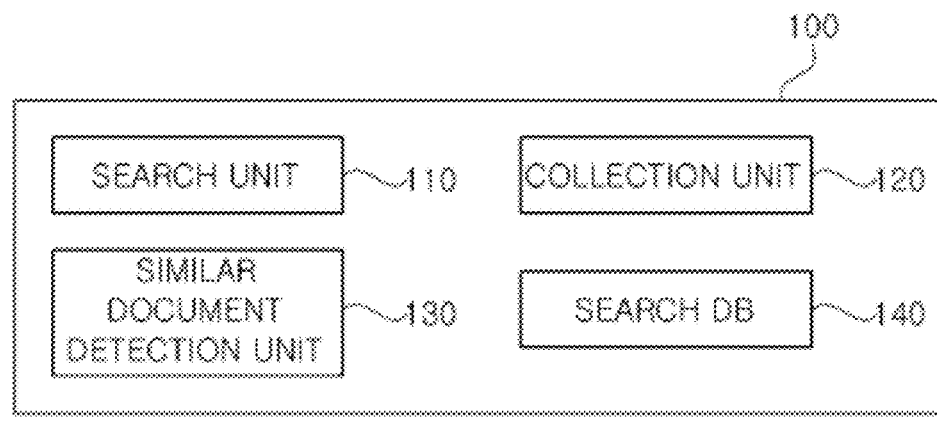
FIG. 3 is a diagram illustrating a detailed configuration of the device to provide a search result according to an exemplary embodiment of the invention.

FIG. 3 is a diagram illustrating a detailed configuration of the device 100 to provide a search result according to an exemplary embodiment of the invention.

Referring to FIG. 3, the device 100 includes a search unit 110, a collection unit 120, a similar document detection unit 130, and a search database 140.

The search unit 110 may search for information corresponding to the queries received from the user terminal device 300 in the search database 140. The search results extracted through the search are transmitted to the user terminal device 300.

The collection unit 120 may serve to search and collect the web documents stored in the web document server 400 by a known systematic and automated method such as a web crawler, and the like. The collection unit 120 may store the searched and collected web documents in the search database 140.

The similar document detection unit 130 may cluster the web documents collected through the collection unit 120 using various methods. The similar document detection unit 130 may further, calculate weights for entities according to whether each entity within the web documents are determined to be a core portion within the web documents. If the web document is determined by the similar document detection unit 130 to be a duplicate or a similar document according to the calculated and applied weights, the search database 140 may be queried to identify web document corresponding to the duplicate or similar document. If a duplicate web document is identified in the search database 140, either the duplicate web document or the stored web document corresponding to the duplicate web document may be deleted. Detailed operations of sub components of the similar document detection unit 130 will be described below.

The search database 140 may include various information collected or stored to provide searched results and to store the web documents collected by the collection unit 120. Further, if the collected web documents are determined to be duplicates in the search database 140 by an operation of the similar document detection unit 130, a portion or all of the web documents may be deleted.

Although FIG. 3 illustrates the search database 140 to store information related to the web documents, the exemplary embodiments of the invention may separately build another database to store the web documents collected and detected by the collection unit 120 and may store the remaining documents from which the duplicated web documents are deleted in the search database 140. Further, in FIG. 3, the search unit 110, the collection unit 120, and the similar document detection unit 130 are each shown in separate blocks, but they may physically be implemented in a single machine. One or more components may physically be implemented in different machines, or physically be implemented in a plurality of machines performing similar operations in parallel. It is apparent to those skilled in the art that exemplary embodiments of the present invention may be variously changed in design without limiting a physical number and location of a machine in which each component is mounted or a database.

Figure 4:
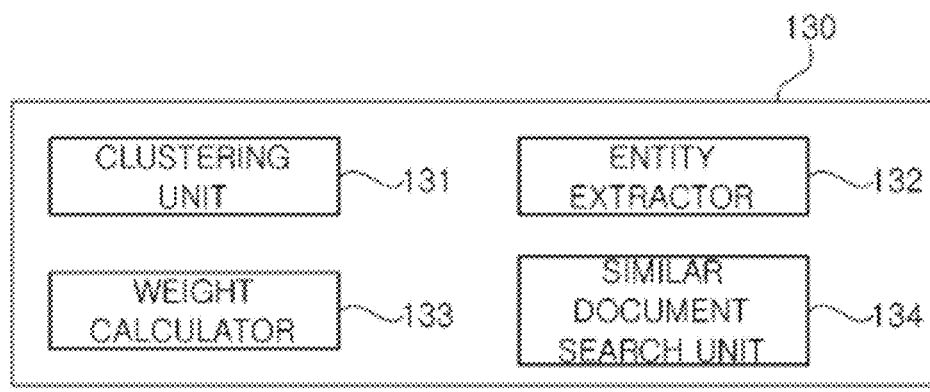
FIG. 4 is a diagram illustrating a detailed configuration of a similar document detection unit according to an exemplary embodiment of the invention.

The similar document detection unit 130 located within the device 100 of FIG. 3 is described in more detail with reference to FIG. 4. FIG. 4 is a diagram illustrating a detailed configuration of a similar document detection unit 130 according to an exemplary embodiment of the invention. As shown in FIG. 4, the similar document detection unit 130 includes a clustering unit 131, an entity extractor 132, a weight calculator 133, and a similar document search unit 134.

The clustering unit 131 may serve to create clusters in which the similar documents may be present among the web documents collected by the collection unit 120. The collected web documents may be stored in the search database 140 or a separate database.

In an example, a method for allowing the clustering unit 131 to create the clusters may include at least one of host clustering, path clustering, query clustering, size clustering, SimHash clustering, document object model (DOM) clustering, or the like. It is apparent to those skilled in the art that various methods may be selected. Further, the clustering unit 131 may create clusters using other similar methods that are not illustrated herein. The clustering unit 131 may also create clusters in which the similar documents may be present using a combination of the illustrated clustering methods and at least one of other non-illustrated methods according to various sequences, and the like.

The host clustering may refer to a method for aggregating web documents including uniform resource locator (URL) having the same source name as other URLs into one cluster. For example, if a web document has the URL referred to as "http://www.naver.com/a/b/c.html?x=1&y=2", the corresponding web documents with the source of "http://www-.naver.com" may be aggregated into one cluster by the host clustering.

The path clustering may refer to a method for creating a cluster of web documents, in which the web documents include a URL having the same name and path as other URLs that may have similar or the same source for the web documents into one cluster. In the aforementioned example, creating the web documents having the same host name and path ("http://www.naver.com/a/b/") into one cluster may be referred to as the path clustering. Here, "http://www.naver-.com" may be the host name and "a/b/" may be the path.

The query clustering may refer to a method for creating a cluster of web documents, in which the web documents include URLs having the same host name, path, and file name or the same parameter added to the file name as other URLs that may have similar or the same source for the web documents into one cluster. Continuing to the aforementioned example, creating the web documents including the URL having the same host name, path, and file extension (http://www.naver.com/a/b/c.html) into one cluster may be referred to as query clustering. Here, http://www.naver.com may be the host name, "a/b/c" may refer to the path, and ".html" may refer to the file extension. In addition, clustering the web documents including the URL having the same parameter, that is, x and y as parameter may be referred to as query clustering.

The aforementioned host clustering, path clustering, and query clustering may be some of the methods used for creating clusters based on the URL that is a source of the web documents. In an example, one cluster may include at least one of the clustering methods described herein or other similar methods based on the number of web documents included in that cluster.

Further, the size cluster may refer to a method for creating a cluster based on a size of the web documents. In an example, the cluster may include web documents having similar file sizes. More specifically, a cluster may include a web document corresponding to a range of 1600 bytes to 1615 bytes. Accordingly, if the web documents are aggregated into that cluster, one or more web documents having a size of 1600 bytes, 1608 bytes, and 1612 bytes may be aggregated into one cluster by the size clustering.

The SimHash clustering may refer to a method for aggregating web documents having similar SimHash values, which may be extractable for each web document, into one cluster. The SimHash, which may be a similarity hash based technology, refers to a hashing operation that may provide a similar hash value if a similar key value is inputted while maintaining a general hashing operation giving different hash values if different key values are input. The SimHash extraction method will be described below by way of example.

A single web document may be parsed and separated into word units, in which each separated word or word unit may be calculated by a specific hash value using the hashing operation to which reference hashing algorithms may be applied. The calculated specific hashing value may be represented by a binary number. If the hashing algorithms used for the hashing operation are able to provide a unique value for specific keys, it may be determined that the hashing algorithms may be used for the SimHash clustering. In an example, algorithms with a hashing operation that may provide a unique value for specific keys may include, without limitation, Secure Hash Algorithm (SHA-1), Hash Algorithm Standard (HAS-160), and other standard algorithms. The SimHash extracted through the SimHash extraction method may refer to a final hash value, which may be obtained by calculating the hash values extracted from each word separated from the single web document in a bit unit.

If performing the calculation in a bit unit, the SimHash of the web document may be extracted by a method for transforming the hash value into a value of 1 if a bit value of a specific position is 1, and the hash value into a value of −1 if a bit value of a specific position is 0. Further, the same method may transform the hash value into a value of 1 if a final value in a bit unit is a positive number and the hash value into a value of 0 if a final value in a bit unit is a negative number, which may be determined by calculating each hash value in a bit unit. In an example, the final value in a bit may refer to a value determined by calculating or adding the hash values of all of the word units in a bit unit.

For example, the web document may be separated in a total of three words as a result of parsing one web document in word units, and the corresponding hash values for each word may be 11000101, 01101110, and 10010010 if being represented by a binary number, as shown in FIG. 6. The SimHash of the corresponding web document may extract SimHash 11000110 by transforming 11000101 into [1, 1, −1, −1, −1, 1, −1, 1], 01101110 into [−1, 1, 1, −1, 1, 1, 1, −1] and 10010010 into [1, −1, −1, 1, −1, −1, 1, −1] for calculating the hash value of each word for each bit unit. Further, the SimHash of the corresponding web document may transform the hash value to [1, 1, −1, −1, −1, 1, 1, −1] based on the final values of the word units that are a result of calculating or adding each hash value in the word units included in a bit unit. As such, the extracted SimHash value may have similar SimHash values for each web document if the contents of the web documents have a similarity level above a reference threshold, even though some contents of the web documents may be partially different from one another.

As such, the SimHash clustering may aggregate web documents with similar SimHash values into one cluster. In this case, in order to determine whether the SimHashes are determined to be similar to one another, a hamming distance between the SimHashes may be determined. If the hamming distance between the SimHashes is determined to be a reference numerical value or less, then the SimHashes or the corresponding web documents may be determined to be similar. For example, if the SimHash is 8 bits and the hamming distance between the SimHashes is determined to be 1, it can be determined that the web documents are similar to one another. The hamming distance may refer to a number of bit values in binary numbers having the same bit number that does not coincide with one another or are different from one another. For example, the hamming distance between the web document of which the SimHash is 11000101 and the web document of which the SimHash is 10010101 is 2 since a second bit and a fourth bit among a total of 8 bits do not coincide with each other or are different from one another. Further, it can be determined that two web documents are not similar to each other if the hamming distance is greater than a reference value. As another example, the hamming distance between a web document having a SimHash value of 11000101 and a web document having a SimHash value of 11010101 may equal to 1 since only the fourth corresponding bit among a total of 8 bits does not coincide with each other. Accordingly, it can be determined that if the hamming distance is determined to be equal to or below a reference value, two web documents may be determined to be similar to each other.

Figures 7A, 7B:
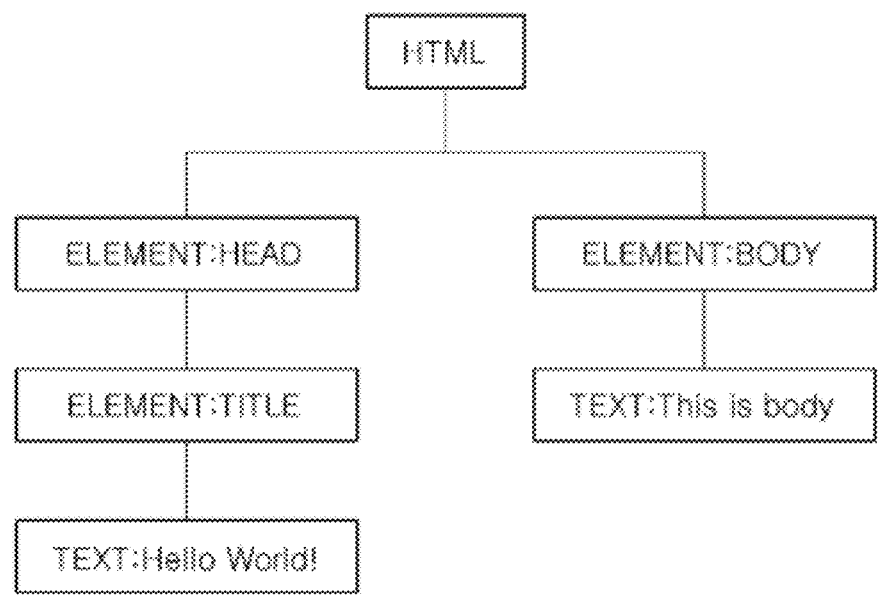
FIG. 7A and FIG. 7B are diagrams illustrating a method for extracting a document object model (DOM) structure of a web document according to an exemplary embodiment of the invention.

Further, the document object model (DOM) clustering may refer to a method for creating the web documents having a similar DOM structure extractable for each web document into a single cluster. As an example of a document structure tree conceptualized as a tree format by extracting the contents of a reference web document, the DOM clustering method can extract a DOM structure format as shown in FIG. 7B from the corresponding web document if the source code of the web document has a structure as shown in FIG. 7A. However, the DOM structure format may not be limited to a format as shown in FIG. 7B. Therefore, if the DOM structure has a document structure of a reference format capable of conceptualizing the contents of the web documents, it may be included in the DOM structure.

As such, the DOM clustering may create the web documents having the similar DOM structure extracted for each web document into one cluster. Here, in order to determine whether the DOM structures are similar to one another, a calculation of percentage of common nodes that may be present among the DOM structure is made, which may be compared against a reference value. If the calculated percentage of common nodes is determined to be at least a reference value, then the web documents may be determined to be similar. More specifically, if a percentage of nodes common among the DOM structures is determined to be at least a reference value, for example 80%, it can be determined that the web documents have the similar DOM structures.

The clustering unit 131 may combine the aforementioned clustering methods in any sequence to create clusters in which the similar documents may be present. As an example, various applications can be implemented by creating the clusters through the host clustering and then SimHash clustering, or by creating the cluster through the host clustering, then DOM clustering, and then size clustering.

The clustering unit 131 may further serve to create the cluster and then, remove the corresponding cluster for accuracy if the number of web documents belonging to the cluster is determined to be smaller than a reference numerical value.

Next, the entity extractor 132 may serve to extract entity from the web documents included in the cluster created by the clustering unit 131, and calculate or determine an importance contribution element value for each entity to determine whether the entity is a core portion of the web document. The importance contribution elements may include hash values of each entity, frequency in which the corresponding entity appears in all of the web documents within the cluster, and the like. In an example, the importance contribution element may be determined from another source. Further, the entity extractor 132 may use weights of extracted entities calculated by the weight calculator 133 based on whether each entity is a core portion within the web document.

The entity may include characteristic components, which may configure the web documents that may be compared for the detection of the similar documents. The characteristic components may include texts parsed and separated from the web document, and may further include values included tags of anchor, embedded, image and the like. Further, these characteristic components may be used to detect similar documents among tags within the web documents, but is not necessarily limited thereto. Weight of each extracted entities may be calculated based on a determination of whether a portion is contributable to the differentiation of the similar document or not, that is, determination of whether the portion is a core portion. The weights may be calculated based on the importance contribution elements for each entity as described above.

In order to extract the entities located within the web documents, the entity extractor 132 may extract a node including at least one of tags of text, anchor, embed, and image based on the DOM structure extracted from the web document to be used as the entity of the web document. In particular, in the case of the texts, the texts may correspond to a portion or a location that may have an effect on the determination of whether the web document is a similar document. More specifically, the respective portion may be determined to be a core portion according to which location of the web document the texts appear, even though the texts may be the same. Accordingly, the texts may further include values indicating a location at which the text appears. As the example, an identification (ID) value existing in upper nodes (for example, a div node (e.g., "div" of FIG. 8A), or the like) of the text node may be combined with the corresponding text as the ID value of the corresponding text to be able to be used as entity. Further, in the case of the texts, the texts may be divided in a blank unit and each thereof may be processed as entity. In addition, a href attribute included in the tag in the case of the anchor, and an src attribute value included in the tag in the case of the embedded node and the image node may be used as the entity.

For example, provided that the source code of the single web document is shown in FIG. 8A, the entity extractable by the entity extractor 132 corresponds to 4 in total, that is, one from the src attribute included in the image node and three obtained by dividing the text included in the text node in a blank unit. The src attribute may be referenced in the first row-first column of FIG. 8B, and the remaining rows of first column may refer to the text included in the text node. The entity extractor 132 may further obtain the hash value for each of the extracted entities, which are enumerated in the first column of FIG. 8B, and the hash value for four extracted entities, which are enumerated in the second column of FIG. 8B.

As in the aforementioned example, the entity extractor 132 may extract one or more entities from each web document included in the same cluster and remove duplicated entities that may be found within a single web document.

Further, the entity extractor 132 may calculate how often duplicates of each entity appears in the web documents included within the cluster based on all of the extracted entities. Continuing to an example of FIG. 8, a total ten duplicates of web documents may be present in a cluster, which is illustrated in FIG. 8C.

Next, the weight calculator 133 may serve to calculate weights of each entity extracted from the entity extractor 132 based on the importance contribution element values. Generally, the weights for each of the extracted entities may be calculated according to its importance or importance contribution element value. In an example, a low weight may be allocated to an entity if it is determined that the entity is not a core portion due to low importance. An entity may be considered to have low weight if the entity is frequently duplicated in the web documents in the cluster. An entity may be considered to have a high weight if it is determined that the entity is a core portion due to high importance. The portion may be determined to have high importance if the duplicated frequency is below a reference threshold in the web documents included within the cluster.

The importance of an entity or a portion may be determined by using an inverted document frequency (IDF) in which importance may be inversely related to a frequency of duplication. In an example, as the frequency of duplication may be low, importance may become high in the reference web documents, and as the frequency of duplication becomes high, importance may become low. More specifically, according to the IDF, the core portions may be determined to be large or of high importance in the reference web documents, if the duplicated frequency of the portion is small in the plurality of web documents located within the cluster. Further, the core portions may be determined to be low weight due to the low importance, if the duplicated frequency of the portion is high in the plurality of web documents located within the cluster.

The calculation equation used at the time of calculating the weights for each entity may apply various equations based on the aforementioned IDF concept and as an example, may include a graph shown in FIG. 9A. A horizontal axis in the graph of FIG. 9A may represent a duplicated frequency (a rate at which an entity of a web document may be duplicated among all the web documents located within the cluster) of the entity among the importance contribution elements and a vertical axis thereof represents the weights for entities. As the rate of duplicated frequency of the entity approaches 1, that is, the frequency that the entity is duplicated in the web documents within the cluster is high, the weight of the entity approaches 0 and thus, the corresponding entity may not correspond to the core portion. Also, as the duplicated frequency of the entity approaches 0, that is, the frequency that the entity is duplicated in the web documents within the cluster is small, the weight of the entity approximates 1 and thus, the corresponding entity may correspond to the core portion. The results of obtaining the weights for four extracted entities shown in FIG. 8 using the graph of FIG. 9A may be shown like Table of FIG. 9B.

Finally, the similar document search unit 134 may serve to apply the weights of each entity calculated by the weight calculator 133. The similarity document search unit 134 may apply the weights to calculate characteristic indexes, in which weights are allocated to each web document included within the cluster. Further, the similarity document search unit 134 may apply the weights to detect the similar documents based on the calculated characteristic indexes. Here, the characteristic index may be construed to include a reference numerical value, a character string, and the like. The characteristic index may be used to differentiate one web document from other web documents, but for convenience of explanation, the characteristic index will be described as a SimHash by way of example. However, the characteristic index is limited thereto. Therefore, if the characteristic index may be used to differentiate one web document from other web documents, any characteristic index may be used.

In order to calculate the SimHash, which may be an example of the characteristic index, the similar document search unit 134 may extract the entity from each web document included within the cluster and calculates the hash value for the extracted entities. The entities for each web document and the corresponding hash value that may be used for the calculation of the SimHash may use the values extracted from the entity extractor 132 as they are. The similar document search unit 134 may represent the hash values for each entity by a binary number and apply the weights calculated in a bit unit by a weight calculator 133. Further, the similar document search unit 134 calculates the final value calculated in a bit unit to use the calculated final value as the SimHash of the corresponding web document. In an example, the final value in a bit may refer to a value determined by calculating or adding the hash values of all of the word units in a bit unit.

If performing the calculation in a bit unit, the SimHash may be extracted by a method for transforming the hash value into 1 if a bit value of a specific position is 1 and transforming the hash value into −1 if a bit value of a specific position is 0. The method may calculate the transformed hash value with a value obtained by multiplying the weights for each entity for each bit. The method may re-transform the hash value into 1 if a final value in a bit unit is determined to be a positive number and re-transform the hash value into 0 if a final value in a bit unit is determined to be a negative number.

Referring to FIG. 10, a single web document may be separated into a total three of entities, which may have hash values of 11000101, 01101110, and 10010010. If the weights corresponding to each entity are 0.3, 0.7, and 0.2, respectively, the entity of the corresponding web document may be arranged for each bit in order to calculate the hash values for each entity for each bit unit. If weights of 0.3, 0.7, and 0.2 are applied to each entity, 11000101 may be arranged as [0.3, 0.3, −0.3, −0.3, −0.3, 0.3, −0.3, 0.3], 01101110 may be arranged as [−0.7, 0.7, 0.7, −0.7, 0.7, 0.7, 0.7, −0.7], and 10010010 may be arranged as [0.2, −0.2, −0.2, 0.2, −0.2, −0.2, 0.2, −0.2]. The three entities may be calculated for each bit unit to provide final values of [−0.2, 0.8, 0.2, −0.8, 0.2, 0.8, 0.6, −0.6]. Accordingly, SimHash values corresponding to the final values may equal to 01101110, which may be extracted from the respective web page. As described above, if the weights are applied to the hash values of each entity in a web document, different SimHashes may be calculated according to the importance of entities included within the web document.

As described above, after the characteristic indexes in which each web document within the cluster is applied to the weights are calculated, the similar document search unit 134 may detect the similar document based on the characteristic index. In this case, as an example of the methods used for detecting the similar document, if a hamming distance between the SimHashes is equal to a reference numerical value or less, for example, 1 if the SimHash is 8 bits, it can be determined that the web documents are similar to one another.

In addition, the similar document search unit 134 may further include an operation of deleting the duplicated web document determined as the similar document from the search database 140. Meanwhile, as the detected results by the similar document search unit 134, if the similar document rate corresponds to at least a reference numerical value, for example, 50%, or if the number of similar documents exists corresponds to at least a reference numerical threshold, for example, 100, the similar document search unit 134 may store the method for creating the corresponding cluster, the weights for each entity and the characteristic indexes to which all the weights of the web documents determined as the similar document, and the like. If the web document belonging to the corresponding cluster is present, the clustering unit 131 may apply each of the stored entities and the weights to the corresponding web document to calculate the characteristic indexes. If the characteristic indexes coinciding with the corresponding cluster are present, the clustering unit 131 may determine that the corresponding web document as the similar document without calculating the separate numerical values used to determine whether the web document is a similar document, such as the hamming distance, or the like. In this case, if the entities that are not stored in advance among the entities of the corresponding web document are present, the characteristic indexes may be calculated by applying the preset weight, for example, 0.5.

Next, improved method for detecting similar documents according to exemplary embodiments of the present invention will be described with reference to FIG. 5.

A user may transmit the queries to the device 100 to provide search results by using the user terminal device 300. The device 100 to provide search results may perform a search by referring to the search database 140 based on the received query. Further, the device 100 may transmit the derived search results to the user terminal device 300. However, the device 100 may create the cluster in which the similar documents may be present to detect the similar documents among the web documents collected through the collection unit 120. The device 100 may also extract entities for each web document belonging to the created cluster and the corresponding importance contribution elements to calculate the weights for each entity. The device 100 may calculate the characteristic index using the calculated weights, and applied to each web document included within the cluster. The device 100 may compare the characteristic indexes of each of the calculated web documents to detect similar documents. In addition, an operation of deleting the duplicated web document from the stored and collected web documents in the search database 140 or the separate database based on the detected similar document results may be performed.

FIG. 5 is a flow chart illustrating a method for detecting a similar document according to an exemplary embodiment of the invention. The method of FIG. 5 below will be described as if performed by the device 100 of FIG. 3, but is not limited as such.

Referring to FIG. 5, the device 100 to provide search results (or, the clustering unit 131 in the similar document detection unit 130 therein) may create a cluster in which the similar documents may be present from the web documents stored in the search database (S510). In creating the cluster, at least one of host clustering, path clustering, query clustering, size clustering, SimHash clustering, and DOM clustering may be used.

Thereafter, the entity extractor 132 of the similar document detection unit 130 may extract one or more entities from the web documents included within the cluster (S520). Further, the entity extractor 132 may also extract importance contribution elements corresponding to the extracted entities. An entity may include, without limitation, texts parsed and separated from the web document, and may further include the href attribute included in the anchor or the src attribute value, which may be included in the tags of embed, image, and the like. In addition, the importance contribution elements may include a numerical value corresponding to a number of times or frequency in which each entity may be duplicated in the web documents included within the cluster. Further, the importance contribution elements may include a numerical value corresponding to hash values for each entity.

Thereafter, the weight calculator 133 of the similar document detection unit 130 may calculate the weights of one or more entities included within the cluster based on the contents extracted from the entity extractor 132 (S530). The weights of each entity may be calculated based on a determination of whether the respective entity corresponds to core portions of the web document. As the detailed example, the corresponding entity may be calculated by applying various equations based on a concept that the weights may be increased as the frequency of the duplicated web documents within the cluster is decreased, and the weights may be reduced as the frequency of the duplicated web documents within the cluster is increased according to the inverted document frequency.

The similar document search unit 134 of the similar document detection unit 130 may calculate the characteristic indexes of the web documents based on the weights applied to the extracted entities from the respective web documents. The similar document search unit 134 may compare the characteristics indexes (for example, if the characteristic index is a SimHash, calculating whether the hamming distance between the SimHashes is equal to or below a reference numerical value) of each of the calculated web documents to determine whether one or more similar documents are present (S540). In addition, although not illustrated, the similar document search unit 134 may further include an operation of deleting the duplicated web document that are determined to be a similar document from the search database 140.

Exemplary embodiments of the present invention may be implemented by a program command type performed by various computer units and may be recorded in a non-transient computer readable medium. The computer readable medium may include at least one of a program command, a data file, a data structure, and the like. The program command recorded in the medium may be particularly designed and configured or may be known to those skilled in the art of computer software. An example of the computer readable recording medium may include magnetic media, such as a hard disk, a floppy disk, and a magnetic tape; optical media, such as CD-ROM, and DVD; magneto-optical media, such as floptical disk; and hardware devices specially configured to store and perform a program command such as ROM, RAM, flash memory, or the like. An example of the program command may include a machine language code such as one produced by compiler and an advanced language code executable by a computer using an interpriter, or the like. The aforementioned hardware device may be configured to be operated as at least one software module so as to perform the operation of the exemplary embodiment of the present invention, and vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method that uses a processor for detecting similar documents, comprising:
    extracting entities from a first web document and a second web document from among web documents;
    determining importance contribution elements corresponding to the entities in the first web document and the second web document;
    calculating, by the processor, weights for the entities based on the determined importance contribution elements;
    calculating, by the processor, characteristic indexes for each of the first web document and the second web document, by
        extracting hash values for the entities, and
        subsequently calculating the characteristic indexes by applying the weights to the hash values for the entities;
    determining whether the first web document and the second web document are similar to each other based on the calculated characteristic indexes;
    deleting one of the first web document and the second web document if the first web document and the second web document are determined to be similar to each other, and
    wherein each of the importance contribution elements includes a frequency of which each of the entities is duplicated within the web documents.

2. The method of claim 1, further comprising:
    clustering the web documents into one cluster.

3. The method of claim 2, wherein the clustering comprises at least one of a host clustering, a path clustering, a query clustering, a size clustering, a SimHash clustering, and a document object model (DOM) clustering.

4. The method of claim 1, wherein the entities are extracted from at least one of a text node, an anchor node, an embed node, and an image node the first web document and the second web document.

5. The method of claim 4, wherein each of the entities extracted from the text node comprises a text identification (ID) value of a corresponding text, the text ID value generated by combining a node identification (ID) value existing in some nodes of the text node with a corresponding text in the first web document and the second web document.

6. The method of claim 1, wherein the calculating weights comprises using an inverted document frequency concept, the inverted document frequency concept increasing a respective one of the weights of a corresponding one of the entities in inverse proportion to decreasing frequency of duplication of the corresponding one of the entities.

7. The method of claim 1, wherein the characteristic indexes are SimHashes.

8. The method of claim 7, wherein the determining whether the first web document and the second web document are similar to each other comprises determining the first web document and the second web document as similar documents if a hamming distance between the SimHashes is equal to or below a reference numerical value.

9. A non-transitory computer-readable medium storing an executable program for execution by a processor that when executed by the processor causes the processor to perform a method comprising:
    extracting entities from a first web document and a second web document from among web documents;
    determining importance contribution elements corresponding to the entities in the first web document and the second web document;
    calculating weights for the entities based on the determined importance contribution elements;
    calculating, by the processor, characteristic indexes for each of the first web document and the second web document, by
        extracting hash values for the entities, and
        subsequently calculating the characteristic indexes by applying the weights to the hash values for the entities;
    determining whether the first web document and the second web document are similar to each other based on the calculated characteristic indexes;
    deleting one of the first web document and the second web document if the first web document and the second web document are determined to be similar to each other,
    wherein each of the importance contribution elements includes a frequency of which each of the entities is duplicated within the web documents.

10. A device to detect similar documents, the device comprising:
    a storage device including a memory component;
    an entity extractor stored on the storage device and configured to extract entities from a first web document and a second web document from among web documents and determine importance contribution elements from the entities of the first web document and the second web document;
    a weight calculator configured to calculate weights of the entities based on the determined importance contribution elements;
    a similar document detector configured to
        calculate characteristic indexes for each of the first web document and the second web document by
            extracting hash values for the entities, and
            subsequently calculating the characteristic indexes by applying the
        weights to the hash values for the entities,
        determine whether the first web document and the second web document are similar to each other based on the calculated characteristic indexes, and
        delete one of the first web document and the second web document if the first web document and the second web document are determined to be similar to each other,
    wherein each of the importance contribution elements includes a frequency of which each of the entities is duplicated within the web documents.

11. The device of claim 10, further comprising:
    a clustering unit configured to cluster the web documents into one cluster.

12. The device of claim 11, wherein the clustering unit is configured to cluster the web documents using at least one of a host clustering, a path clustering, a query clustering, a size clustering, a SimHash clustering, and a document object model (DOM) clustering.

13. The device of claim 10, wherein the entity extractor is configured to extract the entities from at least one of a text node, an anchor node, an embed node, and an image node of the first web document and the second web document.

14. The device of claim 13, wherein each of the entities extracted from the text node comprises a text identification (ID) value of a corresponding text, the text ID value generated by combining a node identification (ID) value existing in some nodes of the text node with the corresponding text in first web document and the second web document.

15. The device of claim 10, wherein the importance contribution elements are a factor in determining whether the corresponding entity is a core portion of the corresponding web document.

16. The device of claim 10, wherein the weight calculator is configured to calculate the weights using an inverted document frequency concept, the inverted document frequency concept increasing respective weights of the entities in inverse proportion to decreasing frequency of duplication of the respective entities.

17. The device of claim 10, wherein the characteristic indexes are SimHashes.

18. The device of claim 17, wherein the similar document detector is configured to determine whether the first web document and the second web document are similar to each other if a hamming distance between the SimHashes is equal to or below a reference numerical value.

* * * * *